UNITED STATES PATENT OFFICE 2,485,225

SYNTHESIS OF HEXADIENE DINITRILE AND PRODUCT

Irving D. Webb, Brandywine Hundred, Del., assignor to E. I. du Pont de Nemours & Company, Wilmington, Del., a corporation of Delaware No Drawing. Application December 11, 1948, Serial No. 64,912

5 Claims. (Cl. 260—465.8)

This invention relates to the synthesis of 1,6-dicyano-2,4-hexadiene and related compounds.

This invention is based upon the discovery that compounds of the formula, $CH_2=CHCROHCROHCH=CH_2$ R being a member of the class consisting of hydrogen and methyl groups (and certain other radicals hereinafter disclosed), react with hydrogen cyanide in the presence of a soluble cuprous salt in an aqueous acidic medium to form dinitriles of the formula, $CNCH_2CH=CRCR=CHCH_2CN$ Evidently two molecular rearrangements (termed "allylic rearrangements") occur simultaneously during the formation of the said nitriles, with the result that both of the nitrile groups in the product occupy terminal positions. These unsaturated nitriles in which the nitrile groups are positioned terminally are believed to be novel compositions of matter.

The unsaturated glycols which are employed as reactants in the practice of the invention may be prepared by any suitable means such as by reduction of alpha,beta-unsaturated carbonyl compounds with zinc amalgam in acetic acid. For example, 3,4-dihydroxy-1,5-hexadiene can be prepared by reduction of acrolein, using the said zinc amalgam-acetic acid reducing agent. Similarly, 3,4-dimethyl-3,4-dihydroxy-1,5-hexadiene can be prepared by reduction of methyl vinyl ketone; also, 3,4-diphenyl-3,4-dihydroxy-1,5-hexadiene can be obtained by reduction of phenyl vinyl ketone, and 2,5-dimethyl-3,4-dihydroxy-1,5-hexadiene by reduction of methacrolein.

Any water-soluble cuprous salt may be employed as a catalyst in the practice of the invention. It is generally preferred to employ cuprous chloride, and to have ammonium chloride and copper powder present in the reaction mixture to keep the copper salt in the cuprous form. The temperature of the reaction mixture during the practice of the invention is generally below about 200° C. and is preferably within the range of 75° to 150° C. Any suitable reaction pressure may be employed, the preferred pressure being not substantially above the pressure required to keep the hydrogen cyanide from escaping from the reaction mixture.

The invention is illustrated further by means of the following examples:

*Example 1.*—A reaction mixture containing 50 grams of 3,4-dihydroxy-1,5-hexadiene, B. P. 80° C./5 mm. ($CH_2=CHCHOHCHOHCH=CH_2$), 100 cc. HCN, 18 grams cuprous chloride, 6 grams ammonium chloride, 1 gram copper powder, 15 cc. water and 1 cc. of concentrated hydrochloric acid was heated in a shaker tube for four hours at 100° C. The resulting product was extracted with chloroform and the chloroform in the extract was evaporated, whereby an oily residue was obtained. Upon crystallization of this residue from methanol a white crystalline product (10 grams, M. P. 89° C. to 92° C.), was obtained. This material had the formula, $C_8H_8N_2$ (calc. N, 21.2, C, 72.7, H, 6.1; found N, 20.65, C, 71.5, H, 6.3%). This product had the structure $CNCH_2CH=CHCH=CHCH_2CN$ as shown by hydrogenation to octamethylenediamine, $NH_2(CH_2)_8NH_2$.

From the mother liquor was isolated by vacuum distillation a mixture (25 grams) of the intermediate cyanhydrin 1-cyano-4-hydroxy-2,5-hexadiene, $N\equiv C-CH_2-CH=CH-CHOHCH=CH_2$ and the dinitrile. This mixture distilled at 124° to 128° C. at 1 mm. as a partially crystalline oil having the following analysis: N, 14.5%; OH no., 162 mg. KOH per gram. Calculated for cyanhydrin: N, 11.4%; OH no., 456 mg. KOH per gram. This cyanhydrin was recycled as follows: 25 grams of the cyanhydrin was heated for 4 hours at 100° C. with 50 ml. HCN, 15 ml. $H_2O$, 2 ml. conc. HCl, 9 grams $Cu_2Cl_2$, 3 grams $NH_4Cl$, 1 gram Cu powder. The reaction product was extracted with chloroform. The solvent was evaporated and the dinitrile isolated by crystallization from methanol.

The 3,4-dihydroxy-1,5-hexadiene which was employed in this example was prepared by the following method:

Two-hundred and forty grams of zinc metal dust was shaken with an aqueous solution of 80 grams of $CuSO_4 \cdot 5H_2O$. After being washed with water, the Zn-Cu couple was covered with about 1 liter of water, and the mixture was chilled in an ice bath. Two-hundred grams of acrolein was added, and with stirring 400 grams of glacial acetic acid was added dropwise over 3 hours. After standing overnight, the reaction mixture was filtered; the filtrate was saturated with salt and continuously extracted with ether for 48 hours. The ether extract was treated with anhydrous potassium carbonate until all acetic acid and water were removed, and distilled. The yield of 3,4-dihydroxy-1,5-hexadiene, boiling at 80° C. at 5 mm. of Hg, was 117 grams (56%).

*Example 2.*—A mixture containing 45 grams 3,4-dihydroxy-1,5-hexadiene, 100 cc. HCN, 36 grams cuprous chloride, 12 grams ammonium chloride, 2 grams copper powder, 30 cc. water, and 2 cc. of concentrated hydrochloric acid was heated in a reaction vessel equipped with a stirrer and a reflux condenser. The heating was continued at gentle reflux for a period of 2.5 hours, after which the reaction mixture was cooled and extracted with chloroform. The chloroform was then evaporated from the extract leaving a residue which upon crystallization from methanol gave 5 grams of $CNCH_2CH=CHCH=CHCH_2CN$, M. P. 89° to 91° C.

It is to be understood that the foregoing examples are illustrative only and that numerous methods of practicing the invention will occur to those who are skilled in the art. For example, any suitable cuprous salt may be employed and any of the known methods for keeping the cuprous salt in solution in the lower state of valence may be employed. It is not necessary to use cuprous halides, since other organic or inorganic salts of copper are equally effective, provided they are water-soluble. Similarly any suitable organic or inorganic acid may be employed to keep the reaction mixture acidic during the course of the reaction. Acids which may be employed include sulfuric acid, phosphoric acid, acetic acid, trichloracetic acid, etc. The hydrogen cyanide which is required as a reactant in practicing the invention is preferably introduced into the reaction mixture as such, although, if desired, it may be formed in situ by introducing a metal cyanide such as sodium cyanide or potassium cyanide, with a substantially equivalent quantity of an inorganic acid such as hydrochloric acid.

I claim:

1. A process for the preparation of 1,6-dicyano-2,4-hexadiene which comprises reacting a glycol of the formula $CH_2=CHCHOHCHOHCH=CH_2$ with hydrogen cyanide in an aqueous acidic solution containing a dissolved cuprous salt as catalyst, whereby a dinitrile of the formula $$CNCH_2CH=CHCH=CHCH_2CN$$

is produced, and thereafter separating the said dinitrile from the resulting mixture.

2. A process for the preparation of 1,6-dicyano-2,4-hexadiene which comprises reacting a glycol of the formula $CH_2=CHCHOHCHOHCH=CH_2$ with hydrogen cyanide in the liquid phase at a temperature not in excess of 200° C. in the presence of an aqueous acidic solution containing a dissolved cuprous salt as catalyst, whereby a dinitrile of the formula $$CNCH_2CH=CHCH=CHCH_2CN$$

is produced, and thereafter separating the said dinitrile from the resulting mixture.

3. A process for the preparation of 1,6-dicyano-2,4-hexadiene which comprises reacting a glycol of the formula $CH_2=CHCHOHCHOHCH=CH_2$ with hydrogen cyanide in an aqueous acidic solution containing a dissolved cuprous salt as catalyst at a temperature within the range of 75° to 150° C. whereby a dinitrile of the formula $$CNCH_2CH=CHCH=CHCH_2CN$$

is produced and thereafter separating the said dinitrile from the resulting mixture.

4. A process for the preparation of 1,6-dicyano-2,4-hexadiene which comprises reacting a glycol of the formula $CH_2=CHCHOHCHOHCH=CH_2$ with hydrogen cyanide in an aqueous acidic solution containing cuprous chloride, ammonium chloride, and hydrochloric acid, in the presence of finely powdered copper, at a temperature within the range of 75° to 150° C., whereby a dinitrile of the formula $$CNCH_2CH=CHCH=CHCH_2CN$$

is produced, and thereafter separating the said dinitrile from the resulting mixture.

5. 1,6-dicyano-2,4-hexadiene.

IRVING D. WEBB.

REFERENCES CITED

The following references are of record in the file of this patent:

Willstatter et al.: Beilstein, Handbuch der Org. Chem., 4th Ed., 2nd suppl., p. 677 (1942).